US011657344B2

(12) United States Patent
Martin et al.

(10) Patent No.: US 11,657,344 B2
(45) Date of Patent: *May 23, 2023

(54) AUTOMATED SCHEDULING ASSISTANT FOR A WORKFORCE MANAGEMENT SYSTEM

(71) Applicant: NICE LTD., Ra'anana (IL)

(72) Inventors: Nicholas Duane Martin, McKinney, TX (US); Brent Allen Haferkamp, Garland, TX (US); Oren Gerstner, Plano, TX (US); Chetan Prajapati, Richardson, TX (US); Juan Claudio Serviere Morales, Allen, TX (US)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,798

(22) Filed: Apr. 8, 2022

(65) Prior Publication Data
US 2022/0230126 A1 Jul. 21, 2022

Related U.S. Application Data

(63) Continuation of application No. 16/400,226, filed on May 1, 2019, now Pat. No. 11,315,050.

(51) Int. Cl.
*G06Q 10/06* (2023.01)
*G06Q 10/0631* (2023.01)
*G06Q 10/1093* (2023.01)

(52) U.S. Cl.
CPC ........... *G06Q 10/063116* (2013.01); *G06Q 10/1093* (2013.01)

(58) Field of Classification Search
CPC .................................. G06Q 10/1093
See application file for complete search history.

(56) References Cited

U.S. PATENT DOCUMENTS 6,587,831 B1 7/2003 O'Brien
6,823,315 B1 11/2004 Bucci et al.
(Continued)

OTHER PUBLICATIONS

"An implicit goal programming model for the tour scheduling problem considering the employee work preferences," S. Topaloglu, I. Ozkarahan—Annals of Operations Research, 2004—Springer (2004).

(Continued)

*Primary Examiner* — Stephanie Z Delich
(74) *Attorney, Agent, or Firm* — Haynes and Boone, LLP

(57) ABSTRACT

A system and methods are provided for a workforce management (WFM) system adapted to perform automated scheduling operations based on scheduling rule(s) and/or parameter(s). The system includes a processor and a computer readable medium operably coupled thereto, to perform the scheduling operations which include automatically generating a survey comprising queries based on the scheduling rule(s) and parameter(s) having at least a first and second dimension, distributing the survey to user(s) via one or more interfaces of the WFM system, detecting each response to the survey via the WFM system, analyzing, using a deep learning model, each survey response, generating one or more recommendations for the user(s) based on analyzing each response using the deep learning model, detecting one or more feedbacks to the survey via the WFM system, and adjusting, using the deep learning model and the feedback(s) to the recommendation(s), one or more of the parameters for the survey.

20 Claims, 6 Drawing Sheets

(56) References Cited

U.S. PATENT DOCUMENTS

| | | |
|---|---|---|
| 7,725,339 B1 | 5/2010 | Aykin |
| 2009/0006160 A1 | 1/2009 | Boegner |
| 2016/0275439 A1 | 9/2016 | Avats |
| 2018/0034965 A1 | 2/2018 | Te Booij et al. |
| 2020/0349494 A1 | 11/2020 | Martin et al. |

OTHER PUBLICATIONS

"Gamification of survey research: Empirical results from gamifying a conjoint experiment", B. Brownell, J. Cechanowicz, C. Gutwin—Gamification in education and . . . , 2015—Springer (2015).

AUTOMATED SCHEDULING ASSISTANT FOR A WORKFORCE MANAGEMENT SYSTEM

CROSS-REFERENCE TO RELATED APPLICATIONS

This application is a continuation of U.S. patent application Ser. No. 16/400,226, filed May 1, 2019, now allowed, the entire contents of which is hereby incorporated herein in its entirety by express reference thereto.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to scheduling in a workforce management system, and more specifically to a system and method for rule generation that automates scheduling in a workforce management system based on a gamified survey system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

A workforce management system may be utilized by a company, organization, or other entity to provide various workforce management solutions to supervisors, managers, and other administrators at the organization. Workforce management may be utilized to provide scheduling assistance to a workforce of employees. However, this scheduling assistance relies on managers and supervisors to directly enter scheduling information, times, and other data. Thus, employees may not receive a "best" or most preferred schedule based on the users interests and preferences. The managers may actively solicit feedback; however, this feedback can take the form of multiple different responses where managers are unable to understand the preferences from the employees. Additionally, this introduces bias and is time consuming and costly to administer and understand the results. Employees may fail to respond, which further introduces error in scheduling. Once the feedback is received, making changes to schedules is a manual process, which further causes error when managers attempt to revise schedules or create new schedules. Thus, electronic workforce management scheduling assistants fail to properly provide scheduling parameters that are helpful and successful in providing solutions to employee scheduling issues.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
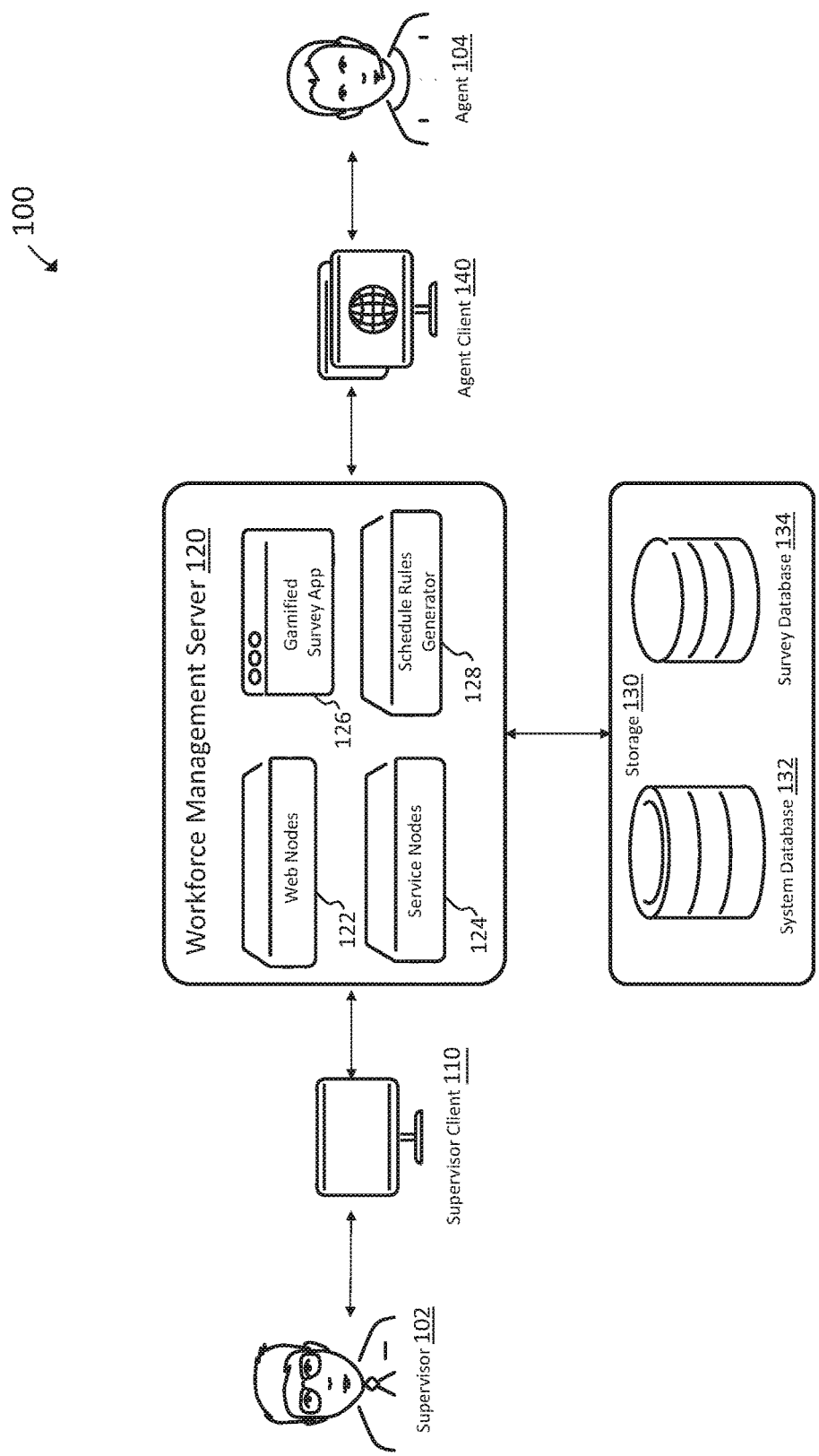
FIG. 1 is a block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a workforce management system, methods, data structures, and systems are provided for a gamified survey and rule generation engine that automates scheduling of agents based on survey responses. A database system stores tables and data structures of survey queries, received responses to the surveys, and rules generated based on the responses. The surveys may be generated, for example, by users or administrators (e.g., managers and supervisors of an organization) of client systems or devices based on input, such as text, menu selections, and the like, when the administrators request survey generation and proliferation. The surveys may further be generated and/or updated based on responses to the surveys.

The survey engine may process the survey question and/or parameter testing input and generate a gamified survey. The gamified survey may present a user, such as an employee or agent of the organization, with a choice between two or more options that require the user to make a selection for a scheduling parameter or preference. For example, the survey may inquire as to whether the user would prefer one or another day off, a number of hours or days to work consecutively, or other potential user preference is scheduling. Moreover, the survey may also request a user rating of the choice, such as how much the user agrees with the choice or preference. Such a rating may correspond to a Likert scale that requests the user to designate how much they agree with the statement.

The survey is then output through an interface of the workforce management system to the users of the organization that require scheduling by the manager or other administrator. The users may provide responses through interface feedback and user input. Using the response to the survey, rules may be generated for each individual user and the users in general. For example, the rules may designate when and how long a user works, as well as breaks the user has. These rules may also be set for a group of users, such as users in a sales department or the like. The rules may therefore apply to one or more users and be used to generate a schedule for the users. The rules may further be used to update and revise the previous surveys to have new questions based on the user preferences, which may be performed without requiring the administrator to change the queries and/or parameters for survey generation.

The embodiments described herein provide methods, computer program products, and computer database systems for gamified survey generation and administrator for automated scheduling assistance. A workforce management system provides a gamified survey and rule generation engine for administrators of an organization. For example, the online system may provide a portal that is accessible by the administrators to enter input used to generate surveys and view the results of scheduling assistance based on responses to the surveys. As part of providing the services to users, the online system stores these surveys and provides rule output and scheduling.

According to some embodiments, in a workforce management system accessible by a plurality of separate and distinct organizations, a gamified survey and rule generation model is provided for identifying, predicting, and generating scheduling rules, thereby enhancing the experience of users during scheduling and reducing user input and data processing required for scheduling assistance.

Example Environment

The system and methods of the present disclosure can include, incorporate, or operate in conjunction with or in the environment of an automation engine, database, and portal, which may include cloud-based computing architecture. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include supervisor client 110, workforce management server 120, storage 130, and agent client 140 for automating scheduling based on gamified survey administration and responses. In other embodiments, environment 100 may not have all of the components listed and/or may have other elements instead of, or in addition to, those listed above. In some embodiments, the environment 100 is an environment in which automated scheduling assistance is provided based on gamified surveys. A supervisor client 110 may be any machine or system that is used by a user to provide preferences, parameters, and/or queries for survey generation. For example, supervisor client 110 can be a handheld computing device, a mobile phone, a laptop computer, a notepad computer, a work station, and/or a network of computing devices. As illustrated in FIG. 1 (and in more detail in FIG. 2) supervisor client 110 might interact via a network with workforce management server 120, which provides the survey to agent client 140 and processes received feedback or responses to the survey for rule generation when automating scheduling.

Supervisor client 110 may be utilized in order to provide input to generate questions for surveys. A question for a survey may correspond to any parameter or query for a gamified survey that is tested for employees or agents at an organization, such as start times, specific day of the week off, level of desire for consecutive days off, desirability to have one day of a weekend off, break times/duration, number of working hours, etc. Other workforce management topics may also be tested, such as working conditions and locations, technology requirements, client interactions, and the like. The input may directly correspond to a query or may correspond to parameters used by workforce management server 120 to generate a query (e.g., selection of days that may be queried for a preference of days off). A supervisor 102 may also make selections of gamification parameters so that the questions and queries may be presented to an agent 104 in a gamified manner that increases user responses and engagement with the survey. However, in other embodiments, workforce management server 120 may instead perform the gamification of the survey based on stored gamification parameters and/or user response rates and interactions with gamified surveys. Additionally, supervisor client 110 may further provide supervisor 102 the results of the surveys with workforce management server 120, including schedules based on gamified survey responses for agent 104. Agent 104 is referred to herein as an "agent" or an "employee" of an organization but may more broadly correspond to any type of member of a workforce.

Agent client 140 may be utilized in order to respond to gamified surveys provided to agent 104 based on schedule queries and parameters provided by supervisor 102 through supervisor client 110. For example, agent client 140 may access one or more portals or applications provided by workforce management server 120, which output surveys to agent 104. In some embodiments, the survey may be transmitted to agent 104 through an electronic communication, such as an email, text message, instant message, or the like. Agent 104 may then respond to gamified survey queries and questions through input to agent client 140. The input may correspond to selections between two or more options associated with a scheduling parameter. Thus, the first dimension of a survey query may be a tradeoff decision between multiple options. The second dimension of the query may be a level of agreement with the parameter (e.g., how much does the employee agree with the importance of the tradeoff decision). This may utilize a rating or Likert scale. Responses to the survey are provided by a plurality of agents including agent 104 and a summary may be maintained and updated by workforce management server 120.

The users of supervisor client 110 and/or agent client 140 may differ in their respective capacities, and the capacity of a particular supervisor client 110 and/or agent client 140 might be entirely determined by applications, permissions, and profiles for the current user. For example, where a salesperson is using agent client 140 to respond to surveys, that user system has the capacities allotted to that salesperson and those computing events may be associated with a salesperson. However, where an administrator or manager is using supervisor client 110 to provide survey queries and view scheduling results, that supervisor client 110 has the capacities allotted to that administrator and may perform actions, survey generation, and response review associated with that administrator. Thus, different users will have different capabilities and perform different desktop events with regard to automation of scheduling rules based on gamified surveys, and corresponding profiles may be provided to workforce management server 120 when generating gamified surveys and schedules based on survey responses. Both supervisor client 110 and agent client 140 may execute a web-based client that accesses a web-based application for workforce management server 120, or may utilize a rich client, such as a dedicated resident application, to access workforce management server 120.

Supervisor client 110 and/or agent client 140 also typically utilize one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the workforce management server 120 or other systems or servers through the web-based or rich client. For example, the user interface device can be used to access data and applications hosted by workforce management server 120, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Supervisor client 110 and/or agent client 140 might communicate with workforce management server 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. In an example where HTTP/HTTPS is used, client 110 might include an HTTP/HTTPS client commonly referred to as a "browser" for sending and receiving HTTP/HTTPS messages to and from an HTTP/HTTPS server, such as workforce management server 120. Such an HTTP/HTTPS server might be implemented as the sole network interface between supervisor client 110 and/or agent client 140 with workforce management server 120, but other techniques might be used as well or instead. In some implementations, the interface between supervisor client 110/agent client 140 and workforce management server 120 includes load sharing functionality.

Supervisor client 110 and/or agent client 140 may utilize a network to communicate with workforce management server 120 and/or each other, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, workforce management server 120 is configured to provide webpages, forms, applications, data, and media content to supervisor client 110 and/or agent client 140 and/or to receive data from supervisor client 110 and/or agent client 140, including questions and parameters for survey generation and responses to surveys. As such, workforce management server 120 provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, workforce management server 120, shown in FIG. 1, executes web nodes 122, service nodes 124, gamified survey application 126, and schedule rules generator 128. For example, in one embodiment, workforce management server 120 includes application servers configured to implement and execute software applications as well as provide related data, code, forms, webpages, and other information associated with web nodes 122, service nodes 124, gamified survey application 126, and schedule rules generator 128, and to store to, and retrieve from, a database system related data, objects, and web page content associated with web nodes 122, service nodes 124, gamified survey application 126, and schedule rules generator 128. For example, workforce management server 120 may implement various functions of web nodes 122, service nodes 124, gamified survey application 126, and schedule rules generator 128, and the processing space for executing system processes, such as running applications as part of web nodes 122, service nodes 124, gamified survey application 126, and schedule rules generator 128.

Web nodes 122 may correspond to the web applications and API services that provide an interface (web browser, desktop application, etc.) for supervisor 102 and/or agent 104 to interact with workforce management server 120.

Service nodes 124 may provide business services of workforce management server 120 that are provided through web nodes 122 and are accessible through supervisor client 110 and/or agent client 140. Gamified survey application 126 corresponds to the application and processes that allow for the creation and management of gamified surveys based on questions, options, and/or rating scales, and further allows for agent 104 and other agents or employees to take the survey. In some embodiments, gamified survey application 126 further corresponds to the application that maintains and updates a summary or statistic results of the employee responses as the agents and employees complete the survey, provides the summary, and further concludes the survey at the end of the survey period to provide full survey results. Schedule rules generator 128 corresponds to a component and processes that takes the results from gamified survey application 126, analyzes the results, builds tentative schedules, and either revises schedules and/or surveys based on feedback to the schedules or implements the schedules for the agents and employees of an organization. Additional processes that may execute on workforce management server 120 include database indexing processes associated with survey questions and scheduling parameters received from supervisor client 110 and survey responses received from agent client 140.

Several elements in the system shown in FIG. 1 include elements that are explained briefly here. For example, each of supervisor client 110 and/or agent client 140 could include a desktop personal computer, workstation, laptop, notepad computer, PDA, cell phone, or any wireless access protocol (WAP) enabled device or any other computing device capable of interfacing directly or indirectly to the Internet or other network connection. Each of supervisor client 110 and/or agent client 140 typically runs an HTTP/HTTPS client, e.g., a browsing program, such as Microsoft's Internet Explorer browser, Netscape's Navigator browser, Opera's browser, or a WAP-enabled browser in the case of a cell phone, notepad computer, PDA or other wireless device, or the like. According to one embodiment, each of supervisor client 110 and/or agent client 140 and all of its components are configurable using applications, such as a browser, including computer code run using a central processing unit such as an Intel Pentium® processor or the like. Similarly, workforce management server 120 and all of their components might be operator configurable using application(s) including computer code to run using a central processing unit, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein utilizing one or more computing devices.

Computer code for operating and configuring workforce management server 120 to intercommunicate and to process webpages, applications and other data and media content as described herein are preferably downloaded and stored on a hard disk, but the entire program code, or portions thereof, may also be stored in any other volatile or non-volatile memory medium or device corresponding by storage 130, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. For example, storage 130 may store system database 132 associated with providing and administering workforce management server 120, web nodes 122, and/or service nodes 124. Additional data may further be stored by storage 130, including survey database 134 used by gamified survey application 126 and/or schedule rules generator 128 for administration of gamified surveys and scheduling based on rules generated from the surveys. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Scheduling Assistance Model

Figure 2:
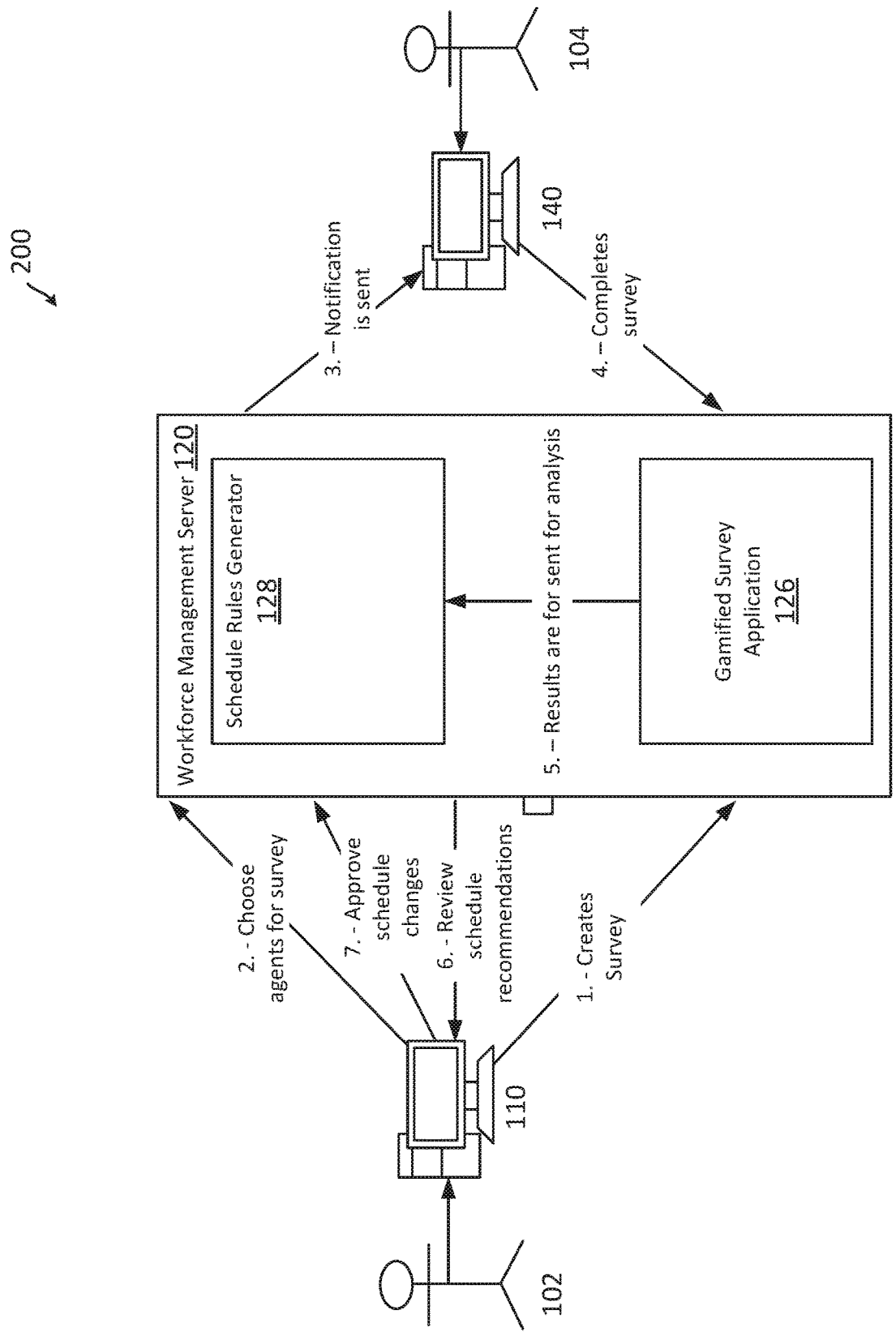
FIG. 2 is a simplified diagram of data flow in an exemplary system environment according to some embodiments.

FIG. 2 is a simplified diagram of data flow in an exemplary system environment according to some embodiments. Environment 200 of FIG. 2 includes supervisor 102, agent 104, supervisor client 110, workforce management server 120, gamified survey application 126, schedule rules generator 128, and agent client 140 discussed in reference to environment 100 of FIG. 1. In this regard, environment 200 displays the transfer of data over a network when generating gamified surveys from input by a supervisor 102 and distributing the gamified surveys to agent 104 for survey response.

In environment 200, supervisor 102 interacts with supervisor client 110 to create a survey, at step 1, with gamified survey application 126. The survey may be created by providing input, such as text input, menu selections of queries and/or survey parameters, or other data that may be provided to gamified survey application 126 to generate a survey having one or more queries associated with a schedule for a user. For example, these parameters or questions to generate a survey may correspond to discernable factors which set the conditions around a given schedule. Exemplary parameters and/or questions may be directed to days off, consecutive days off, desirability to have particular days off, break times and/or durations, a number of working hours, and the like. The survey may also be generated by supervisor 102 interacting with gamified survey application 126 to set parameters or settings for the gamification of the survey, such as a game type for presentation of the survey. For example, the survey may correspond to flash cards or other interface output game that may be presented so that users may select between two or more options. These gamified survey questions may further include a level of agreement to selection of one of the options, which may be presented as a Likert or rating scale. Selection of the survey parameters, questions, rating system, and/or gamification settings may be performed through one or more interface options presented on supervisor device 110 after accessing gamified survey application 126. For example, the interface may provide text entry elements, menu elements, and other interface elements for selection of survey parameters. An exemplary gamified survey is shown in more detail in FIG. 5.

At step 2, supervisor 102 then designates and chooses the agents to take the survey with workforce management server 120. For example, at least agent 104 may be selected through an interface provided by workforce management server 120. The interface may provide a listing user names, identifiers, and/or other data that may allow for selection of agent 104 and other agents, or the contact identifier may be entered by supervisor 102. The selected agents may correspond to employees or users within an organization that are requested to respond to the survey for scheduling assistance. For example, supervisor 102 may be a manager of agent 104 and the other agents, or may be another management member that is tasked with scheduling agent 104 and the other agents. Based on selection of agent 104 (as well as other agents), at step 3, notification of the survey is sent to the agents, such as to agent client 140. The notification may be sent through an electronic communication, such as an email, text message, instant message, or other type of communication. The communication may be sent having the gamified survey for response by the agents. In other embodiments, however, the communication may alert the agents that the survey is accessible through gamified survey application 126 and available on a portal or other accessible interface. Once accessed, the survey may be presented to agent 104 on agent client 140 so that the survey can be completed. Agent 104 completes the survey, at step 4, which includes making selections from the two or more tradeoff options, questions, and/or other query in the gamified manner for the survey. Agent 104 may further provide additional feedback or responses in the form of an agreement rating, Likert scale, or other agreement parameter based on agent 104's agreement with the question or option.

The response is therefore provided to gamified survey application 126 for processing. Gamified survey application 126 then processes the responses from agent 104 and the other agents, and provides the results (e.g., individual user and/or group tabulated data from responding to the survey) to schedule rules generation 128. The data may therefore correspond to the survey responses from the agents or may correspond to summarized data from the agent's responses (e.g., tables, numbers, or other data of the survey responses computed through a tabulated or scored process). Schedule rules generator 128 may then process the data to determine one or more rules for scheduling assistance. For example, a rule may correspond to one or more agents schedule preferences to generate a schedule of their work time. A rule may determine which days a user prefers to work or would like off, as well as a number of days or hours to work, how many consecutive days or hours to work, break times, start or end work times, and the like. The rules may be determined based on the selection between choices by agent 104 and the other agents and may also be ranked or given priority based on the agents' rating of their selections. For example, the agent may more highly prefer to have certain days off over a particular start time, which may be used to generate a specific rule for that agent to schedule those days off but allow for variable start times including the non-preferred start time of the agent in order to accommodate for the days off preferred by the agent.

Once the rules are determined, schedules and recommendations are generated based on the rules by schedule rules generator 128, at step 6, and the schedule recommendations are output to supervisor 102 through supervisor client 110. Rules and schedules may be determined after closing of the survey, such as a time limit for responding to the survey. The schedules and recommendations may be generated in an automated manner without requiring user input from supervisor 102. Thus, supervisor 102 is not required to make active scheduling decisions and instead workforce management server 120 may make the recommendations based on responses collected from agents including agent 104. By automating the process, supervisor 102 is not required to actively provide input for processing and entry into schedules for agents, thereby saving processing time and input requirements. Supervisor 102 may then respond to the schedule recommendations and changes, at step 7, and accept those schedule changes where applicable. However, if supervisor 102 does not approve the schedule, supervisor 102 may request changes to be made and/or the survey responses re-processed to determine additional or different rules. In some embodiments, additional agents are requested to participate in a survey and further responses are processed so that rules may be determined for a larger set of agents and within a broader organization department. The processes and methods associated with the data flow in environment 200 are described in more detail with regard to FIGS. 3 and 4.

Figure 3:
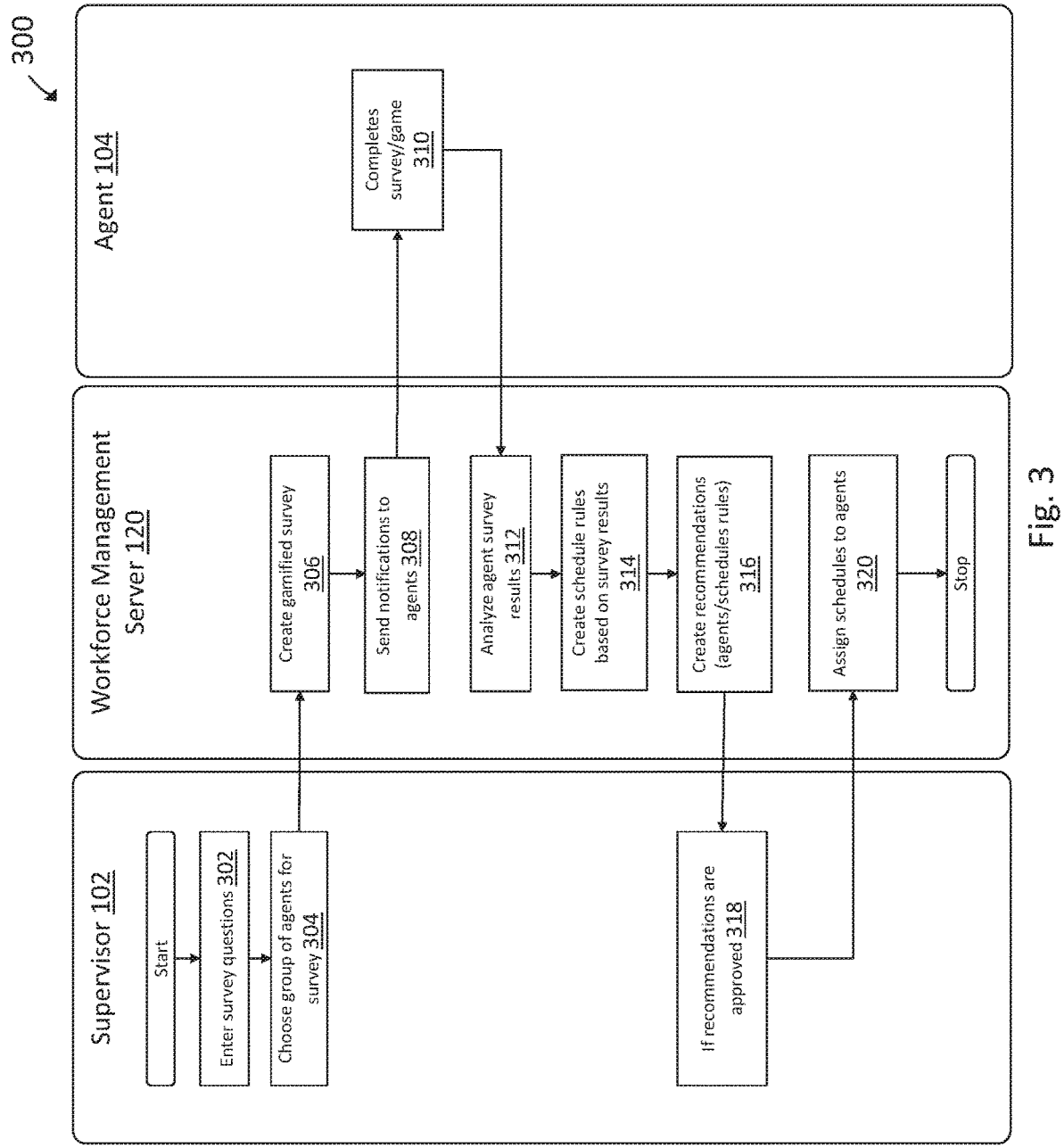
FIG. 3 is a simplified diagram of a method for performing automated scheduling assistance based on gamified surveys taken by agents or users of a workforce management system according to some embodiments.

FIG. 3 is a simplified diagram of a method for performing automated scheduling assistance based on gamified surveys taken by agents or users of a workforce management system according to some embodiments. Note that one or more steps, processes, and methods described herein of flowchart 300 may be omitted, performed in a different sequence, or combined as desired or appropriate. Flowchart 300 of FIG. 3 includes supervisor 102, agent 104, and workforce management server 120 discussed in reference to environments 100 and 200 of FIG. 1 and FIG. 2, respectively.

At step 302 of flowchart 300, supervisor 102 begins the process by entering survey questions, which may include survey parameters or queries associated with scheduling work time and other workforce scheduling preferences for employees at an organization. In other embodiments, other types of survey questions may be entered that are associated with preferences or parameters of a workforce of a company, such as vacation preferences, work or assignment requirements, benefits and compensation, client workload and/or assignment, work location preferences, or other query that may assist with provided scheduling, assignments, and/or workforce management to the agents, employees, and management of the organization. The survey questions may be entered based on text questions proposed to the user, such as through text input. The survey questions may also be generated by selecting different menu options that automate query generation based on selected parameters for scheduling. The questions may also be entered with choices for responding to the questions, such as tradeoff options between two or more selections. In some embodiments, the tradeoff option may correspond directly to the query where the user is required to select between two or more options and their preference. Additionally, supervisor 102 may generate or indicate a rating or Likert scale used for a second dimension to each survey question or tradeoff that indicates a degree that the user agrees with their selection or answer. Once the survey has been generated, supervisor 102 indicates one or more agents, such as a group of agents (e.g., a workforce, department, etc.), such as agent 104 to respond to the survey, at step 304.

Workforce management server 120 then receives the input of the questions, parameters, and/or options for the survey questions, as well as the group of agents for the survey, and generates a gamified survey automatically based on gamification principles and preferences, at step 306. In this regard, workforce management server 120 may execute gamified survey application 126 to generate the survey. Gamified survey application 126 may automate the processes to generate, transmit, and process surveys and responses to surveys such that user input is not required, and real-world surveys that need to be manually summarized and processed are not used. Therefore, the digital surveys and automated processes of workforce management server 120 may remove the difficulties in the manual processes of survey administration and workforce management so that outside survey apparatuses and systems are not required. The gamified survey may include two or more dimensionalities, such as a first dimension to select between two or more options or answers to a question. The second dimensionality may correspond to a level of agreement with selection of an answer or option by the agent, such as a rating or Likert scale that indicates an agent's preference in the selection or their agreeability with the selection (e.g., strongly agree, neutral, somewhat disagree, and the like). Additionally, based on the questions and/or parameters for scheduling or other workforce management, workforce management server 120 may require a different number of queries, questions, or tradeoff options. For example, the number of questions, parameters, and/or tradeoff options may require an $X^2$-type number of queries, where based on the input parameters of X (e.g., 2, 3, 4, 6 parameters) would result in $X^2$ questions or options (e.g., 3, 9, 16, or 36 questions, respectively). In response to generating the gamified survey, at step 308, notifications are sent to agents by workforce management server 120, such as an electronic communication having the gamified survey and/or a link or process to access the gamified survey through one or more interfaces provided by workforce management server 120.

Agent 104 then completes the survey and/or game, at step 310. The gamified survey may be presented in a game manner that encourages user engagement and completion by presenting interface elements, data, and games that a user may respond to in a digital manner. Completion of the survey may be done before ending of a period of time for agents to complete the survey. Completion of the survey may generate survey responses or results from agent 104, that may then be sent back to workforce management server 120 for processing. For example, schedule rules generator 128 of workforce management server 120 may receive the survey results from agent 104 and analyze the survey results, at step 312. Analysis of the survey results may correspond to compiling the survey results into a statistical analysis, tally, or other summary of agent 104's responses, as well as the other agent responses. At the end of a survey time, the final total and/or summary of all of the agents' responses, as well as the summary of particular agent responses, may be analyzed to determine preferences and/or scheduling rules (or other workforce management task) for all agents surveyed as well as specific agents in that survey group.

At step 314, schedule rules and other recommendations are created based on the survey results, responses, and summaries. In order to generate schedule rules for scheduling one or more agents, the summaries for each agent and for the group of agents may be processed to determine agent preferences for their schedules. For example, agents may select one option between two or more options that they prefer, and a degree of preference for the selection. A scoring algorithm or other logic may determine agents' overall preferences and most highly preferred preference as well as lower preferred preferences. The algorithm may score each agent's preferences and the group of agents' preferences based on the selection of the option and the amount of agreement or preference for that selection. For example, a weigh (e.g., 1-5 or 1-10, a percentage, etc.) may be assigned to a selection of an option based on the agent's rating or Likert response. This algorithm may be used to determine a most highly preferred schedule or rules for scheduling, such as preferences for certain days off, number of consecutive working days, hours is a working day, break lengths or times, or other scheduling issue. The optimization algorithm may therefore optimize an agent's preferred schedule at least based on their responses to the survey. In further embodiments, the schedule may also be optimized based on other agents' responses and the organization's requirements for the workforce, such as minimum working agents or employees at a time, number of hours required to work during a time period (e.g., day, week, month, and/or year), sick or vacation time limits, employee requirements for a client or associated business (e.g., certain agents required to be on staff), state or country legal requirements, and the like.

The optimization algorithm may therefore generate a plurality of rules that maximize employee and agent preferences in their work scheduling. Due to the numerous input data and functions, millions if not billions of different rules may be calculated by the algorithmic process for a particular workforce, thereby making the automated rule generation function of schedule rules generator 128 faster and more efficient than other survey administration processes. Thus, the automated functionality of schedule rules generator 128 may include coded logic to automatically generate and process these scheduling rules. In other embodiments, the workforce management may be associated with other workforce issues that may be managed, such as vacation, compensation, client work or interactions, locations of work, and other types of work related functions. In such embodiments, different rules may be determined for workforce management by an optimization algorithm to determine a user's preferred work function. Using the generated rules and the agents or employees, recommendations for schedules are determined, at step 316. This may correspond to a daily, weekly, monthly, or other time period of required work days, hours, etc. The schedule may also designate time off, break or meal times, and the like. At step 318, the recommendations for the schedule are output to supervisor 102. Supervisor 102 may view the recommendations through one or more portals and interfaces of workforce management server 120. Supervisor 102 may approve or reject the recommendations and rules. If rejected, new rules may be determined by adjusting weights of particular values, revising the gamified survey automatically to retest particular preferences of agents, and revising the rule values for the scoring algorithm based on feedback from supervisor 102. If accepted (and/or after revising scheduling based on rejected rules and recommendations), flowchart 300 proceeds to step 320, where workforce management server 120 assigns schedules to agents based on the recommendations and rules agreed upon by supervisor 102.

Figure 4:
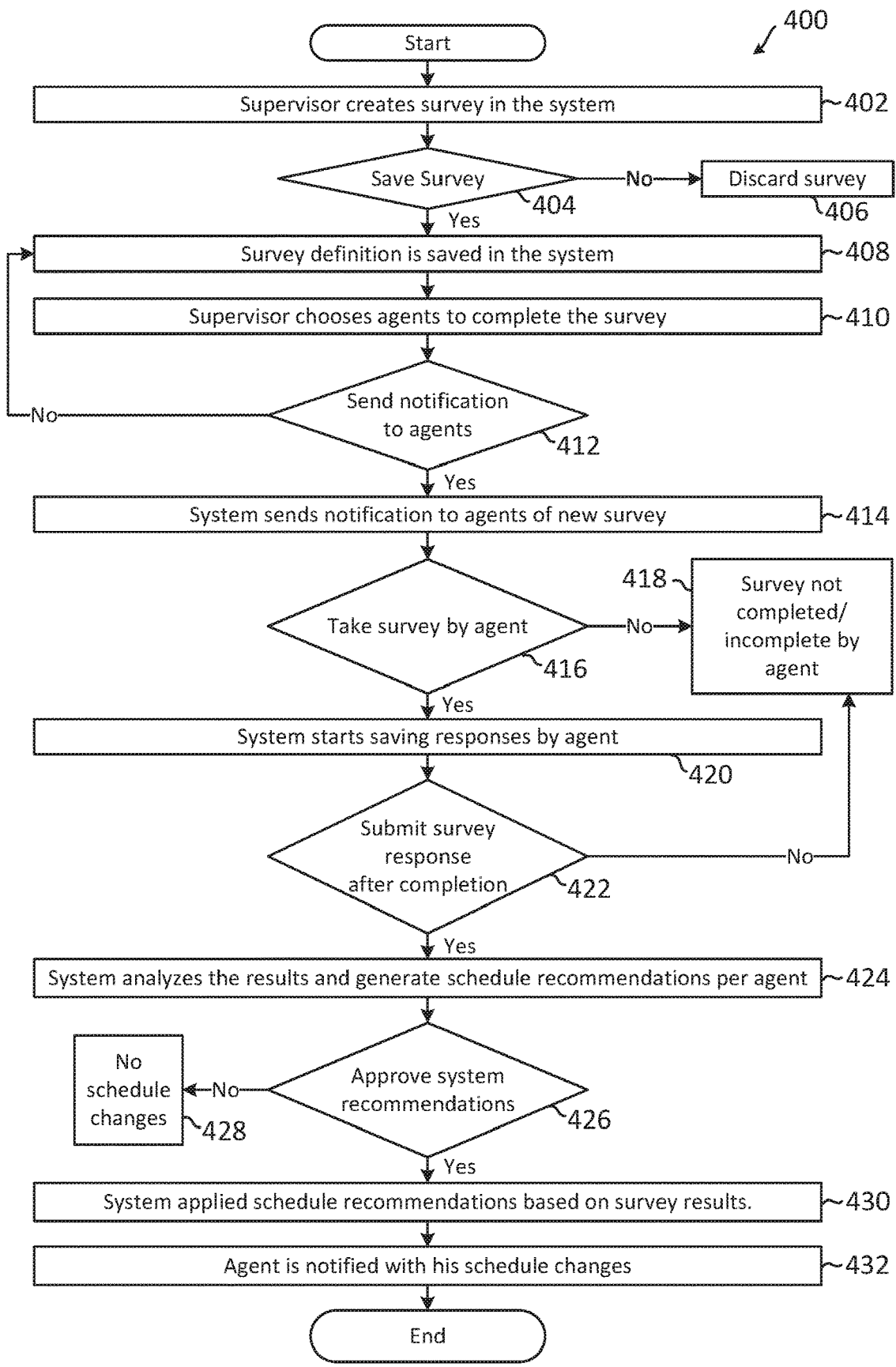
FIG. 4 is a simplified diagram of a method for administering and processing gamified surveys for automated scheduling assistance according to some embodiments.

FIG. 4 is a simplified diagram of a method for administering and processing gamified surveys for automated scheduling assistance according to some embodiments. In some embodiments, gamified survey administration and schedule rule generation described in method 400 of FIG. 4 can be implemented and performed using workforce management system 120, and in particular through gamified survey application 126 and schedule rules generator 128. During the discussion of method 400, reference may be made to FIG. 5, where FIG. 5 is a simplified diagram of a gamified survey according to some embodiments.

One or more of the processes 402-432 of method 400 may be implemented, at least in part, in the form of executable code stored on non-transitory, tangible, machine-readable media that when run by one or more processors may cause the one or more processors to perform one or more of the processes 402-432. In some embodiments, method 400 can be performed by one or more computing devices in environment 100 of FIG. 1.

The model of method 400, such as automating gamified survey and schedule rule generation, uses deep learning algorithms and approaches to perform automated scheduling in a workforce management system. When utilizing deep learning, data balancing is performed to obtain the highest possible accuracy based on the recommendations or responses to the system. Alternative weighting to responses may be tested, which allows minority responses to be considered and not ignored. The deep learning model may be closed-loop such that the particular weights used to train the system may be continually adjusted and the accuracy of such recommendations using the deep learning model may be improved. In some embodiments, this includes taking input data from a manager or supervision and generating gamified surveys for agents or employees of an organization automatically without requiring generation and administration of the surveys directly. In some embodiments, this further includes processing responses and additional results from agent completion of the surveys, generating scheduling rules and parameters for a workforce, and providing the rules and recommendations for scheduling to the supervisor and/or the agents.

Figure 5:
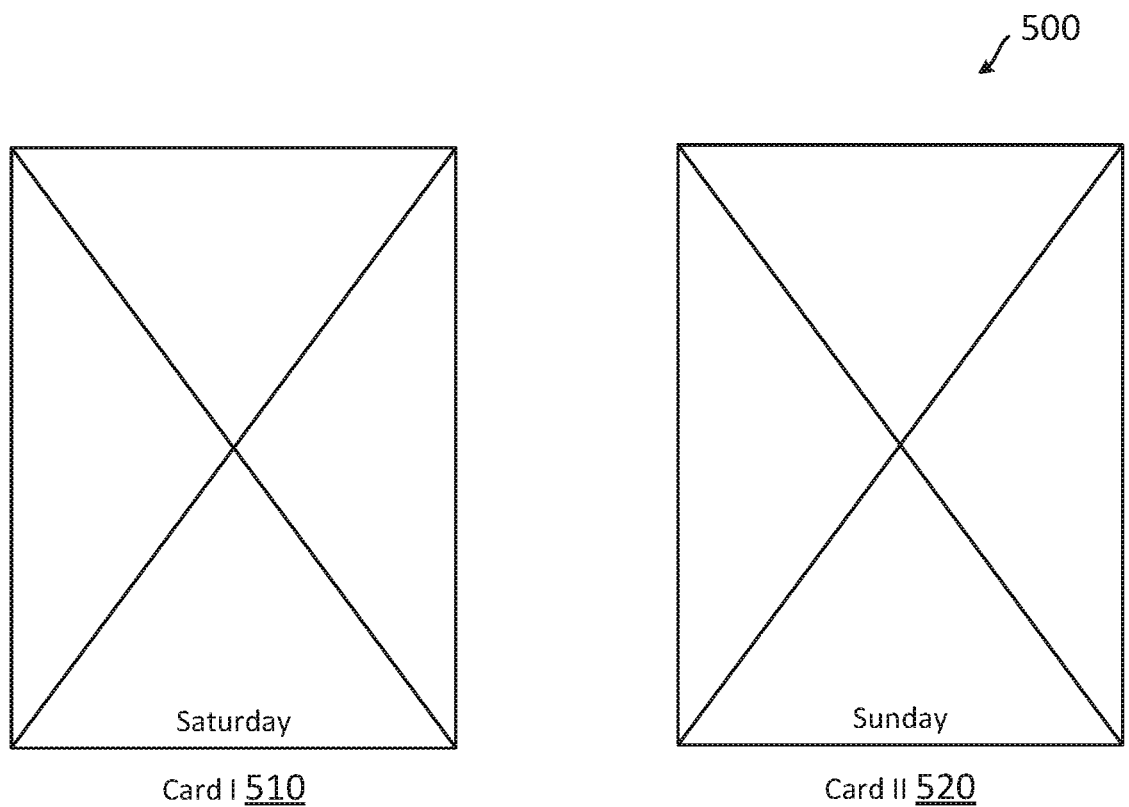
FIG. 5 is a simplified diagram of a gamified survey according to some embodiments.

To accomplish this, and with reference to FIGS. 4 and 5, the method 400 starts with a process 402, where a supervisor creates a survey within the system. An exemplary survey is shown in environment 500 of FIG. 5. For example, two options may be provided to a user in the form of a digital flashcard game, where a first card 510 shows one option and a second card 520 shows a second option in response to a question 530. Both the options for first card 510, second card 520, and question 530 may be generated in response to parameters, text input, and other data provided by a supervisor, manager, or other administrator at an organization. In some embodiments, the supervisor may directly select or input question 530 and the options for first card 510 and second card 520. However, in other embodiments, parameters for scheduling (e.g., weekend work preferences) may be selected, which may cause automatic generation of question 530 and the corresponding options for first card 510 and second card 520. As previously discussed, the parameters for the questions may cause the square of the number of parameters in resulting questions, such as X parameters generate $X^2$ questions (Q) or $X^2=Q$. Thus, the questions may test the different options for each scheduling parameter as a tradeoff between the different options and a comparison between each parameter.

Environment 500 of FIG. 5 further displays a progress bar 540 that shows a level of completeness of the survey and a remaining time, number of questions, or length of the gamified survey. In some embodiments, progress bar 540 may include a save feature to leave the gamified survey so the agent may return at a later time to complete the survey. Environment 500 also include a rating scale 550, shown as a Likert scale indicating a user or agents agreeability with selection of either first card 510 or second card 520 in response to question 530. For example, question 530 requests that a user indicate which day off they prefer, Saturday for first card 510 or Sunday for second card 520. Selection of one of these options fulfills the first dimensionality response to question 530. But further to indicate a level of importance or preference, the user may further select between the interface elements for rating scale 550. In environment 500, selection of "Mostly Agree" from rating scale 550 indicates that the user has a high preference between the selection of first card 510 or second card 520. Once multiple questions have been generated for the survey, the gamified version of the survey may be saved at process 404, where method 400 proceeds to process 408 and the survey definition is saved in the system, such as workforce management system 120. However, if the survey is discarded at process 404, method 400 proceeds to process 406 where the survey is discarded, and the administrator may leave the system or proceed back to the beginning of method 400.

Once the survey definition is saved in the system at process 408, the supervisor may choose employees to complete the survey, at process 410. For example, the supervisor may designate names, email addresses, identifiers, phone numbers, etc., which may be used to electronic communications with the particular agents and employees. At process 412, a determination is made of whether to send a notification to employees. If no notifications are requested to be sent, method 400 reverts to process 408 where the survey definition exists and is saved in the workforce management system. However, if notifications are requested to be sent to the selected agents and/or employees, at process 414, the system sends the notifications of the survey to each selected employee and/or to the group of employees (e.g., a group email or message).

Employees and agents may then choose to take the survey at process 416. If an employee does not open and complete or leaves an incomplete survey, at process 418 the survey results may be discarded or held as incomplete for later use or completion. However, if the employees or agents begin to complete, the workforce management system starts saving all of the responses at process 420. For example, in reference to environment 500 of FIG. 5, the employee or agent may select between first card 510 and second card 520 indicating their preference, and then further select one of the agreement levels or preferences of rating scale 550. The employee or agent may then proceed iteratively through all of the questions within the gamified survey while playing the game or otherwise engaging in the survey. Input by the employees or agents may correspond to interface element selections through an input device, as well as text, voice, and/or touch inputs that may be used to select or respond to questions. Once completed, the survey responses are submitted for processing after completion, at process 420.

At process 424, the workforce management system analyzes the results and generates schedule recommendations per agent or employee. The results may be analyzed to generate specific rules for single agents, as well as groups of agents, such as a workforce, team, or department. Rules may be used to determine preferences for scheduling or other workplace management for an agent or a group of agents. For example, a rule may be "Agent A prefers to work Saturday but not Sunday" or may be more complicated to further include " . . . And does not have a preference between starting work at 8 AM or 9 AM." Rules may be more or less complicated as required by the system so that the rules may be used to generate specific schedules for the employees and/or agents of the organization. At process 426, the recommendations and/or rules are provided to the supervisor and the supervisors determines whether to approve or decline. If declined, then method 400 proceeds to process 428 where no scheduling changes occur. However, if approved (or if changed based on a request by the supervisor), then at process 430, the workforce management system applies the schedules, recommendations, and/or rules to the schedules based on the survey results. Further, agents and employees are notified of the schedule changes, at process 432. This may further include soliciting further feedback and survey responses.

As discussed above and further emphasized here, FIGS. 1, 2, 3, 4, and 5 are merely examples of workforce management server 120 and corresponding methods for training and use of gamified survey application 126 and schedule rules generator 128, which examples should not be used to unduly limit the scope of the claims. One of ordinary skill in the art would recognize many variations, alternatives, and modifications.

Figure 6:
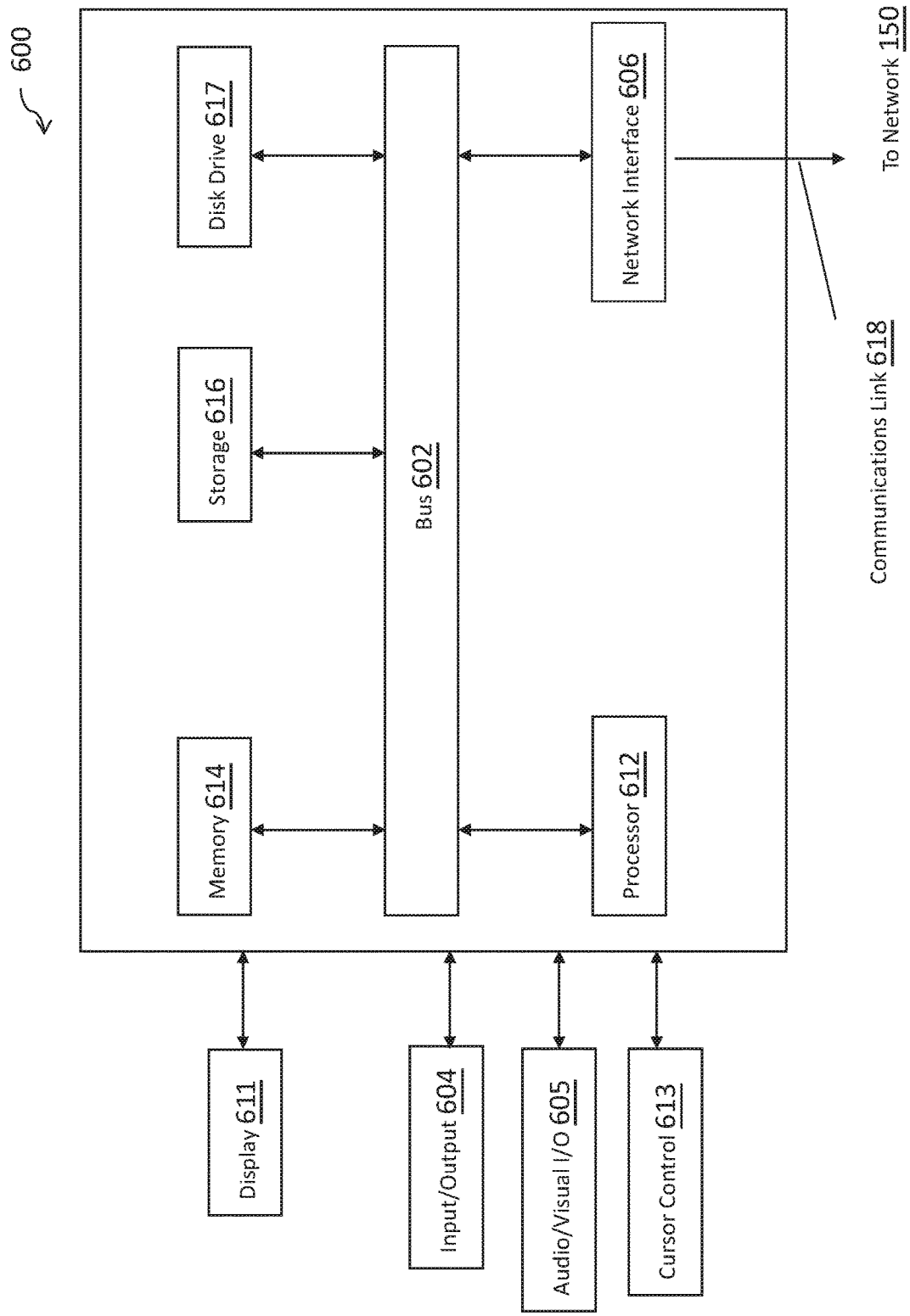
FIG. 6 is a simplified diagram of a computing device according to some embodiments.

FIG. 6 is a block diagram of a computer system suitable for implementing one or more components in FIGS. 1 and 2, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A workforce management system adapted to perform automated scheduling operations based on one or more scheduling rules and parameters, the workforce management system comprising:
 a processor and a computer readable medium operably coupled thereto, the computer readable medium comprising a plurality of instructions stored in association therewith that are accessible to, and executable by, the processor, to perform the automated scheduling operations which comprise:
  automatically generating a survey comprising queries having at least a first dimension and a second dimension based on the one or more scheduling rules and the parameters;
  distributing the survey to one or more users via one or more interfaces of the workforce management system, wherein the distributing comprises:
   providing, on a web portal of the workforce management system using web nodes connected to service nodes for computing services of the workforce management system, an availability of the survey via the one or more interfaces, wherein the web nodes comprise a web application and an application programming interface (API) service;
  monitoring, via the web nodes, user inputs associated with the queries over a time period;
  detecting, via the web nodes based on the monitoring, one or more responses to the survey during the time period, wherein the one or more responses comprise inputs by the one or more users to a gamified version of the survey accessible through the web portal;
  analyzing, using a deep learning model of the workforce management system, the one or more responses to the survey;
  generating, using executable rule logic of a schedule rules generator based on outputs of the deep learning model from the analyzing, one or more recommendations for the one or more users based on analyzing the one or more responses using the deep learning model, wherein the schedule rules generator comprises an automated computing component of the workforce management system that executes the executable rule logic for generating a schedule of the one or more users;
  detecting, from the computing services via the service nodes, one or more feedbacks to the survey;
  adjusting, using the deep learning model and based on the one or more feedbacks to the one or more recommendations, one or more of the parameters for the survey;
  detecting, via the web nodes based on the monitoring, one or more additional responses to the survey having the adjusted one or more of the parameters; and
  applying, using the web nodes, the one or more additional responses to the schedule of the one or more users with the workforce management system; and
  after an expiration of the time period, reconfiguring, on the web portal, the survey based on the one or more recommendations, the adjusted one or more of the parameters, and the schedule, wherein the reconfigured survey is further available via the web nodes.

2. The workforce management system of claim 1, wherein the parameters comprise options selection to the one or more users that are associated with at least one of a day off from work, a number of consecutive working days, a work start-time, a work end-time, or an amount of hours for a workday.

3. The workforce management system of claim 1, wherein the automated scheduling operations further comprise:
 determining a reward to allocate to the one or more users based on the one or more responses; and
 providing the reward to the one or more users via the workforce management system.

4. The workforce management system of claim 1, wherein the automated scheduling operations further comprise:
 removing the survey from the workforce management system after one of the time period or a survey expiration length has expired.

5. The workforce management system of claim 1, wherein the first dimension comprises a first query requiring one of two choices, and wherein the second dimension comprises a second query associated with an agreement level with the one of the two choices to the first query.

6. The workforce management system of claim 5, wherein the agreement level comprises multiple choice options using one of a rating scale or a Likert scale.

7. The workforce management system of claim 1, wherein the automated scheduling operations further comprise:
 receiving an acceptance of the one or more recommendations,
 wherein the applying the one or more additional responses to the schedule is further based on the acceptance.

8. A workforce management system adapted to perform automated scheduling operations based on one or more scheduling rules and parameters, the workforce management system comprising:
 a processor and a computer readable medium operably coupled thereto, the computer readable medium comprising a plurality of instructions stored in association therewith that are accessible to, and executable by, the processor, to perform the automated scheduling operations which comprise:
  automatically generating a survey comprising queries based on the one or more scheduling rules and parameters having at least a first dimension and a second dimension;
  distributing the survey to one or more users via one or more interfaces of the workface management system;
  detecting one or more responses to the survey via the workforce management system;
  analyzing, using a deep learning model of the workforce management system, the one or more responses to the survey;
  generating one or more recommendations for the one or more users based on analyzing the one or more responses using the deep learning model;
  detecting one or more feedbacks to the survey via the workforce management system; and
  adjusting, using the deep learning model and based on the one or more feedbacks to the one or more recommendations, one or more of the parameters for the survey, wherein adjusting the one or more of the parameters for the survey utilizes a closed loop training process based at least on the one or more recommendations or the one or more feedbacks.

9. A method for execution by an automated scheduling operation based on one or more scheduling rules and parameters of a workforce management system, which method comprises:

automatically generating a survey comprising queries having at least a first dimension and a second dimension based on the one or more scheduling rules and the parameters;

distributing the survey to one or more users via one or more interfaces of the workforce management system, wherein the distributing comprises:

providing, on a web portal of the workforce management system using web nodes connected to service nodes for computing services of the workforce management system, an availability of the survey via the one or more interfaces, wherein the web nodes comprise a web application and an application programming interface (API) service;

monitoring, via the web nodes, user inputs associated with the queries over a time period;

detecting, via the web nodes based on the monitoring, one or more responses to the survey during the time period, wherein the one or more responses comprise inputs by the one or more users to a gamified version of the survey accessible through the web portal;

analyzing, using a deep learning model of the workforce management system, the one or more responses to the survey;

generating, using executable rule logic of a schedule rules generator based on outputs of the deep learning model from the analyzing, one or more recommendations for the one or more users based on analyzing the one or more responses using the deep learning model, wherein the schedule rules generator comprises an automated computing component of the workforce management system that executes the executable rule logic for generating a schedule of the one or more users;

detecting, from the computing services via the service nodes, one or more feedbacks to the survey;

adjusting, using the deep learning model and based on the one or more feedbacks to the one or more recommendations, one or more of the parameters for the survey;

detecting, via the web nodes based on the monitoring, one or more additional responses to the survey having the adjusted one or more of the parameters; and applying, using the web nodes, the one or more additional responses to the schedule of the one or more users with the workforce management system; and after an expiration of the time period, reconfiguring, on the web portal, the survey based on the one or more recommendations, the adjusted one or more of the parameters, and the schedule, wherein the reconfigured survey is further available via the web nodes.

10. The method of claim 9, wherein the parameters comprise options selection to the one or more users that are associated with at least one of a day off from work, a number of consecutive working days, a work start-time, a work end-time, or an amount of hours for a workday.

11. The method of claim 9, further comprising:
determining a reward to allocate to the one or more users based on the one or more responses; and
providing the reward to the one or more users via the workforce management system.

12. The method of claim 9, further comprising:
removing the survey from the workforce management system after one of the time period or a survey expiration length has expired.

13. The method of claim 9, wherein the first dimension comprises a first query requiring one of two choices, and wherein the second dimension comprises a second query associated with an agreement level with the one of the two choices to the first query.

14. The method of claim 13, wherein the agreement level comprises multiple choice options using one of a rating scale or a Likert scale.

15. The method of claim 9, further comprising:
receiving an acceptance of the one or more recommendations,
wherein the applying the one or more additional responses to the schedule is further based on the acceptance.

16. A method for execution by an automated scheduling operation based on one or more scheduling rules and parameters of a workforce management system, which method comprises:

automatically generating a survey comprising queries based on the one or more scheduling rules and parameters having at least a first dimension and a second dimension;

distributing the survey to one or more users via one or more interfaces of the workface management system;

detecting one or more responses to the survey via the workforce management system;

analyzing, using a deep learning model of the workforce management system, the one or more responses to the survey;

generating one or more recommendations for the one or more users based on analyzing the one or more responses using the deep learning model;

detecting one or more feedbacks to the survey via the workforce management system; and adjusting, using the deep learning model and based on the one or more feedbacks to the one or more recommendations, one or more of the parameters for the survey, wherein adjusting the one or more of the parameters for the survey utilizes a closed loop training process based at least on the one or more recommendations or the one or more feedbacks.

17. A non-transitory computer-readable medium having stored thereon computer-readable instructions executable to cause an automated scheduling operation based on one or more scheduling rules and parameters of a workforce management system to perform scheduling operations which comprises:

automatically generating a survey comprising queries having at least a first dimension and a second dimension based on the one or more scheduling rules and the parameters;

distributing the survey to one or more users via one or more interfaces of the workforce management system, wherein the distributing comprises:

providing, on a web portal of the workforce management system using web nodes connected to service nodes for computing services of the workforce management system, an availability of the survey via the one or more interfaces, wherein the web nodes comprise a web application and an application programming interface (API) service;

monitoring, via the web nodes, user inputs associated with the queries over a time period;

detecting, via the web nodes based on the monitoring, one or more responses to the survey during the time period, wherein the one or more responses comprise inputs by the one or more users to a gamified version of the survey accessible through the web portal;

analyzing, using a deep learning model of the workforce management system, the one or more responses to the survey;
generating, using executable rule logic of a schedule rules generator based on outputs of the deep learning model from the analyzing, one or more recommendations for the one or more users based on analyzing the one or more responses using the deep learning model, wherein the schedule rules generator comprises an automated computing component of the workforce management system that executes the executable rule logic for generating a schedule of the one or more users;
detecting, from the computing services via the service nodes, one or more feedbacks to the survey;
adjusting, using the deep learning model and based on the one or more feedbacks to the one or more recommendations, one or more of the parameters for the survey;
detecting, via the web nodes based on the monitoring, one or more additional responses to the survey having the adjusted one or more of the parameters; and
applying, using the web nodes, the one or more additional responses to the schedule of the one or more users with the workforce management system; and after an expiration of the time period, reconfiguring, on the web portal, the survey based on the one or more recommendations, the adjusted one or more of the parameters, and the schedule, wherein the reconfigured survey is further available via the web nodes.

18. The non-transitory computer-readable medium of claim 17, wherein the parameters comprise options selection to the one or more users that are associated with at least one of a day off from work, a number of consecutive working days, a work start-time, a work end-time, or an amount of hours for a workday.

19. The non-transitory computer-readable medium of claim 17, wherein the schedule operations further comprise:
determining a reward to allocate to the one or more users based on the one or more responses; and
providing the reward to the one or more users via the workforce management system.

20. The non-transitory computer-readable medium of claim 17, wherein the schedule operations further comprise:
removing the survey from the workforce management system after one of the time period or a survey expiration length has expired.

\* \* \* \* \*